United States Patent Office 3,019,196
Patented Jan. 30, 1962

3,019,196
PROCESS FOR INHIBITING CORROSION
Donald L. Andersen and Jean B. Thielen, Minneapolis, Minn., assignors to General Mills, Inc., a corporation of Delaware
No Drawing. Filed Oct. 6, 1958, Ser. No. 765,299
4 Claims. (Cl. 252—392)

This invention relates to a method of inhibiting corrosion and to corrosion inhibitor compositions.

In steam plant operation the corrosive action of condensate in return lines and in heat exchangers has long been recognized by the power industry and by boiler treatment companies. It is believed that the corrosive action of steam condensate is due largely to the presence of dissolved gases therein, such as carbon dioxide and oxygen. A great deal of work has been directed toward solution of this problem. One of the methods of treatment is based on protection from the offending gas by formation of a monomolecular layer on pipe walls imparted by a filming type amine. A common inhibitor of this type used today as a steam condensate corrosion inhibitor is octadecylamine acetate. This compound is a hard solid which forms unstable dispersions in water.

It has now been found that certain morpholinium compounds and the readily hydrolyzable salts thereof have physical and chemical characteristics providing many advantages as corrosion inhibitors. These compounds have the following general type formula:

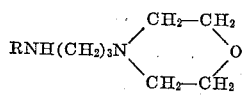

where R is an aliphatic carbon chain of 8 to 22 carbon atoms. The salts of these compounds are soft solids which readily form clear water solutions. The partial salts of these compounds in isopropyl alcohol solutions are liquid, easily dispersed in water and form solutions when diluted with water. Also, the compounds are soluble in fuel oil and act to prevent sludges and stabilize color as well as acting as a corrosion inhibitor.

It is, therefore, an object of this invention to provide a method of inhibiting corrosion.

It is also an object of this invention to provide a novel type of compound which is a highly effective corrosion inhibitor and which can be used in low concentrations.

Another object of this invention is to provide a corrosion inhibitor which is readily soluble in aqueous media.

One satisfactory method for the preparation of the class of compounds designated above is the reaction of an N-fatty propylene diamine with dichloroethyl ether. The reaction is believed to take place according to the following reaction:

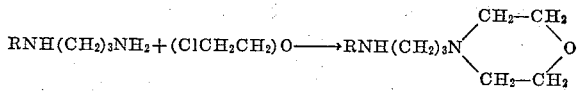

Typical polyamines of the type employed can be prepared by the reaction of a fatty amine with acrylonitrile to produce the cyanoethyl aliphatic amines which can then be hydrogenated to produce the N-aliphatic substituted propylene diamine. The fatty amine employed in the reaction can be prepared by reaction of ammonia with fatty acids to form the fatty nitrile and subsequent reduction of the nitrile to the corresponding fatty amine. The procedure and conditions employed in preparing the polyamines are well known and practiced commercially.

The following example will serve to illustrate the preparation of the present class of compounds.

EXAMPLE I

One mole of tallow amino propyl amine (319 g.), one mole (plus 10% excess) dichloroethyl ether (157.3 g.), and two moles (plus 10% excess) sodium hydroxide (88 g.) as a 50% aqueous solution (88 g. water) were combined in a one liter, three neck flask equipped with a condenser, thermometer and mechanical stirrer. The reaction mixture was heated and refluxed for a total of six hours. The water and excess ether were distilled out by heating the reaction mixture to 180° C. The product, 1-(N-morpholino)-3-tallow amino propane, was then filtered to remove sodium chloride and any excess sodium hydroxide. The product is a clear yellow-orange liquid of about the same color as the initial amine.

Other products having a different fatty radical may be prepared in the same manner by using other fatty amino propyl amines as the starting material.

The aliphatic group bonded to one of the nitrogen atoms is preferably a higher fatty acid residue, that is, the R group is preferably an alkyl radical obtained from fatty acids. Either saturated or unsaturated acid residues containing from 12 to 18 carbon atoms are particularly desirable. Fatty acids providing such residues can be obtained from most naturally occurring fats and oils such as soybean oil, coconut oil, tallow, tall oil, etc.

The morpholino compounds can be used directly as inhibiting agents. However, it has been found that the effectiveness of these agents is greatly increased when the compounds are employed in the form of readily hydrolyzable salts of such acids as acetic acid. Any acid forming readily hydrolyzable salts can be used. Illustrative of such acids are acetic acid, propionic acid, citric acid, and glycolic acid.

As noted previously the salts of the present compounds are readily dispersed into solutions. The solubility characteristics can be seen from the following Table I which also shows the solubility characteristics of octadecylamine acetate which is one of the common inhibitors in present use. The term "tallow" whereever used refers to the fatty acid residue obtanied from tallow.

Table I
SOLUBILITY

| Compound | Conc. | Emulsifier | Conc. of emulsifier | Amine acid | Approx. percent solubility | Description | Gardner viscosity of dispersion |
|---|---|---|---|---|---|---|---|
| Octadecylamine | P.p.m. 1,000 | None | P.p.m. | | 0 | Insoluble—solid separates | |
| 1-(N-morpholino)-3-tallow amino propane | 1,000 | do | | | 75 | 100% soluble; after sl. oil separation on standing. | |
| Octadecylamine | 1,000 | Isopropanol | 1,000 | | 0 | Insoluble—solid separates | |
| 1-(N-morpholino)-3-tallow amino propane | 1,000 Percent | do | 1,000 Percent | | 90 | Slight amount white solid at top—10% | |
| Do | 1 | do | 1 | | 90 | do | |
| Octadecylamine acetate | 1 | do | | 1:1 | 75 | Viscous cloudy dispersion | I. |
| 1-(N-morpholino)-3-tallow amino propane acetate. | 1 | | | 1:1 | 100 | Clear yellow solution | A-1. |
| Octadecylamine acetate | 1 | Isopropanol | 1 | 2:1 | 50–75 | Viscous cloudy dispersion | G. |
| 1-(N-morpholino)-3-tallow amino propane acetate. | 1 | do | 1 | 2:1 | 100 | Clear yellow solution | A-1. |
| Octadecylamine acetate | 1 | do | 1 | 4:1 | 50–75 | Viscous cloudy dispersion | B. |
| 1-(N-morpholino)-3-tallow amino propane acetate. | 1 | do | 1 | 4:1 | 98 | V. sl. white ppt. at top. Also sl. opaque | A-1. |
| Octadecylamine acetate | 1 | | | 4:1 | 25 | Viscous cloudy dispersion | |
| 1-(N-morpholino)-3-tallow amino propane acetate. | 1 | | | 4:1 | 90 | Sl. opaque solution. White ppt. separates | |
| Octadecylamine acetate | 5 | Isopropanol | 5 | 1:1 | 30–50 | Solution separates—30% clear yellow—70% viscous. | |
| Do | 5 | | | 1:1 | 25 | Viscous—partly insoluble | |
| 1-(N-morpholino)-3-tallow amino propane acetate. | 5 | Isopropanol | 5 | 4:1 | 100 | Yellow—sl. opaque solution | A. |

It is readily apparent from the results of the preceding table that the compounds of the present invention are soluble and form a less viscous solution than the octadecylamine acetate which is practically insoluble. Contrary to what would ordinarily be expected, the compounds of the present invention provide greater protection in spite of their solubility characteristics.

The compounds were then subjected to a steam condensate test. This test is conducted in a special laboratory apparatus using line steam. The line steam first passes through a reducing valve and subsequently through a glass aspirator, through three glass condensers in series, and through three glass chambers to the drain. The flow rate of steam condensate is regulated by the incoming steam pressure. The temperature of the condensate is controlled by the number of condensers used and by the flow of cooling water through the condensers. The first glass chamber is used as a mixing chamber, the second as a test chamber for steel coupons and the third chamber for the electrical resistance probe. As the steam passes through the glass aspirator, a solution of the inhibitor is drawn in through the aspirator side arm. The flow of inhibitor is restricted by capillary tubing connecting the large reservoir of inhibitor solution to the side arm. Also connected to this side arm is another short capillary tube leading to a gas flow meter and a carbon dioxide cylinder. For a given set of test conditions, the amount of carbon dioxide in the steam condensate is regulated by a needle valve and diaphragm on the cylinder. The usual test conditions are 6.0–6.2 p.s.i. steam pressure, 70–75° C. condensate temperature, steam condensate flow at 1 cc. per second, and inhibitor solution flow at 0.01 cc. per second. The carbon dioxide level under these conditions is maintained approximately at 165 p.p.m. and the oxygen level at 0.0–0.4 p.p.m.

The corrosion rate in these tests was measured using electrical resistance probes. This probe is inserted into the system allowing 15–30 minutes for equilibration before making preliminary adjustments. The probe is connected to the Labline-Pure Corrosion Meter which gives direct readings of the loss of thickness due to corrosion of the metal probe. These readings are in microinches (millionths of an inch) and can be converted to mils per year penetration. The test probe forms two arms of a resistance measuring circuit, a Wheatstone bridge. One arm is a metal ribbon (one mil in thickness) exposed to the corroding medium and attached to the second arm, a corresponding metal strip protected by a glass shield. Since the two arms of the bridge are at the same temperature, any change in resistance is due to corrosion of the exposed metal strip. By means of suitable electronic amplification and calibration, this resistance change is read on the meter as microinches loss of thickness.

The following Table II illustrates the protection afforded by the compounds of the present invention. The specific inhibitor used was the partial acetate salt of 1-(N-morpholino)-3-tallow amino propane formed by adding to the morpholino compound about 25% of the amount of acetic acid required to form the full acetate salt. It was found that the full acetate salt is not required although it can be used.

In general the addition of any acetic acid will improve the dispersibility of the morpholino compounds. Accordingly the morpholino compound itself or the partial acetate salts thereof and including the full acetate salt may be used.

Table II

STEAM CONDENSATE TEST

[170 p.p.m. $CO_2$; 0.3 p.p.m. $O_2$; 73° C.]

[Inhibitor—4 p.p.m. of the partial acetate salt of 1-(N-morpholino)-3-tallow amino-propane]

| Time (hrs.) | Metal loss ($\mu$ inches) | |
|---|---|---|
| | No inhibitor | Inhibitor |
| 0 | 0 | 0 |
| 20 | 17 | [1] 17 |
| 30 | 33 | 30 |
| 35 | 40 | 35 |
| 40 | 52 | |
| 50 | 80 | |
| 55 | [2] 100 | |
| 80 | | 57 |
| 90 | | [3] 59 |
| 100 | | 61 |
| 120 | | 67 |
| 140 | | 75 |
| 150 | | 76 |
| 160 | | 85 |
| 170 | | 90 |
| 180 | | 100 |
| 185 | | |

[1] Inhibitor feed started.
[2] Electrical resistance probe off scale.
[3] Inhibitor feed stopped.

Table II shows the results of 1-(N-morpholino)-3-tallow amino-propane (4/1) partial acetate at 4 p.p.m. Feeding of the inhibitor began at 20 hours of operation. After 80 hours of feeding the corrosion was essentially stopped. The inhibitor feed was then stopped and the corrosion remained essentially stopped for an additional 40 hours. This illustrates the film persistence of the present class of compounds. Even with the cessation of feed of inhibitor nearly complete protection continues for about 40 hours. The film persistence of octadecylamine acetate is relatively low. On cessation of feed of this inhibitor, it was found that the corrosion rate returned to the level of a system without inhibitor in a short time such as 2–3 hours.

For the purpose of comparison a similar test was run using octadecylamine acetate as an inhibitor. Table III shows the results from using this inhibitor.

*Table III*

[Inhibitor—Octadecylamine acetate]

| Time (hrs.) | No inhibitor (155 p.p.m. $CO_2$; 0.2 p.p.m. $O_2$ 71° C.) | Metal loss ($\mu$ inches) | |
|---|---|---|---|
| | | 4 p.p.m. inhibitor (155 p.p.m. $CO_2$; 0.2 p.p.m. $O_2$ 71 C.) | 10 p.p.m. inhibitor (160 p.p.m. $CO_2$; 0.3 p.p.m. $O_2$ 74° C.) |
| 0 | 0 | 0 | 0 |
| 20 | 14 | | |
| 24 | 18 | | |
| 26 | 22 | (¹) | (¹) |
| 30 | 27 | 25 | 20 |
| 40 | 45 | 38 | 22 |
| 45 | 70 | 48 | 30 |
| 50 | 80 | 58 | 35 |
| 57 | ² 100 | 80 | 40 |
| 62 | | ² 100 | 45 |
| 80 | | | 48 |
| 100 | | | 58 |
| 120 | | | 69 |
| 140 | | | 76 |
| 160 | | | 84 |
| 180 | | | 93 |
| | | | 100 |

¹ Inhibitor added.
² Electrical resistance probe off scale.

Comparing the data of Tables II and III, it is apparent that the octadecylamine acetate was relatively ineffective as an inhibitor when used in the same concentration. Without inhibitor a metal loss of 100$\mu$ inches occurred at approximately 55 hours of operation. At 4 p.p.m. a metal loss of 100$\mu$ inches with octadecylamine acetate occurred at about 60 hours while with the 1-(N-morpholino)-3-tallow amino-propane acetate this occurred at 185 hours and this in spite of cessation of feed of inhibitor at 100 hours. Continued feed of inhibitor would afford protection for an even greater period. To approximate the effect of the 1-(N-morpholino)-3-tallow amino-propane acetate, the octadecylamine acetate had to be used in a concentration of 10 p.p.m. or about 2½ times the amount of 1-(N-morpholino)-3-tallow aminopropane acetate used.

The compounds were also subjected to a mineral acid test. The mineral acid screening test consists of placing approximately 150 cc. test solution in a 250 cc. Erlenmeyer flask fitted with a Pyrex glass hook in a rubber stopper. A prepared coupon (1020 mild steel, 1″ x 1″ x ⅟₁₆″) is suspended on the hook and completely immersed in the test solution. The flasks are then placed in a 70° C.±0.5° C. water bath for six hours. The percent inhibition is calculated from the difference between the average percent metal dissolved in the absence of an inhibitor and the average percent metal dissolved in the presence of an inhibitor, divided by the average percent metal dissolved in the absence of an inhibitor. Test results shown 1-(N-morpholino)-3-tallow aminopropane to be a good mineral acid inhibitor.

Compound (250 p.p.m. in 5% HCl): Percent inhibition
1-(N-morpholino)-3-tallow amino propane
    95.7, 97.2
N-tallow propylene diamine _____ 91.0
N-tallow amine _____ 76.6
Octadecylamine _____ 67.0

A fuel oil test was also conducted. This test consists of storing 50 and 100 p.p.m. inhibited fuel oil at 140° F. for thirteen weeks. Under these conditions normal fuel oil degrades in color and sludges out. The 1-(N-morpholine)-3-tallow amino-propane is oil soluble and appears to stabilize the color of the oil somewhat and prevents heavy sludging. The compound will also exhibit corrosion inhibition properties in oil.

Now, therefore, we claim:

1. A method of preventing corrosion of metallic surfaces coming in contact with liquid media having corrosive properties comprising adding to said media a corrosion inhibiting amount of a compound selected from the group consisting of morpholino compounds represented by the structural formula

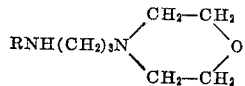

where R is an aliphatic hydrocarbon radical having from 8 to 22 carbon atoms, and the readily hydrolyzable carboxylic acid salts thereof.

2. A method as defined in claim 1 in which R is an aliphatic hydrocarbon radical having from 12 to 18 carbon atoms.

3. A method of rendering boiler water non-corrosive comprising introducing into said boiler system a corrosion inhibiting amount of a readily hydrolyzable carboxylic acid salt of a compound represented by the structural formula

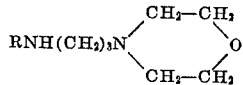

where R is an aliphatic hydrocarbon radical having from 8 to 22 carbon atoms.

4. A method of rendering boiler water non-corrosive comprising the step of introducing into said boiler system a corrosion inhibiting amount of the acetate salt of 1-(N-morpholino)-3-tallow amino-propane.

References Cited in the file of this patent
UNITED STATES PATENTS

| 2,239,841 | Cook _____ Apr. 29, 1941 |
| 2,585,826 | Olsen _____ Feb. 12, 1952 |
| 2,703,802 | Norton _____ Mar. 8, 1955 |
| 2,805,201 | Fischer _____ Sept. 3, 1957 |
| 2,813,904 | Lot et al. _____ Nov. 19, 1957 |
| 2,840,525 | Jones _____ June 24, 1958 |

FOREIGN PATENTS

| 740,879 | Germany _____ Nov. 2, 1943 |